United States Patent [19]
Ishii et al.

[11] 3,822,648
[45] July 9, 1974

[54] GUIDING SYSTEM FOR STEERING A VEHICLE

[75] Inventors: Takemochi Ishii; Masaki Koshi, both of Tokyo, Japan

[73] Assignee: Japan Society for the Promotion of Machine Industry, Tokyo, Japan

[22] Filed: Aug. 30, 1972

[21] Appl. No.: 284,713

[30] Foreign Application Priority Data
Aug. 31, 1971 Japan.................................. 46-66792

[52] U.S. Cl.................................... 104/245, 188/40
[51] Int. Cl.................................... B61f 9/00
[58] Field of Search............ 104/245, 247, 105, 130, 104/242, 243; 188/40

[56] References Cited
UNITED STATES PATENTS
419,616   1/1890   McCrory et al. ...................... 188/40
FOREIGN PATENTS OR APPLICATIONS
1,189,771   10/1959   France................................ 104/247
668,916   8/1963   Canada............................... 104/247
1,082,511   5/1960   Germany ............................ 104/243
603,469   6/1948   Great Britain....................... 104/247

*Primary Examiner*—Milton Buchler
*Assistant Examiner*—Barry L. Kelmachter
*Attorney, Agent, or Firm*—Lane, Aitken, Dunner & Ziems; Warren B. Kice

[57] ABSTRACT

A guiding system for a computer controlled vehicle including a flat track guide-way and a guide channel coextensive with and under the track surface. The vehicle is equipped with a sterring guide link which carries at least two guide wheels in an offset or staggered relationship on a lower crank portion. Two of the guide wheels follow the vertical inner walls of the guide channel. The system further includes a safety mechanism, for preventing derailment, in the form of an additional linkage carrying two additional guide wheels. Emergency braking means is also provided.

7 Claims, 4 Drawing Figures

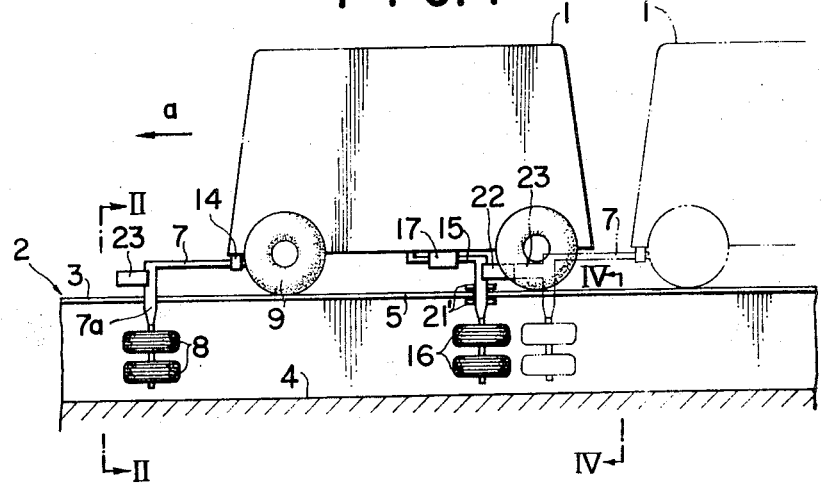
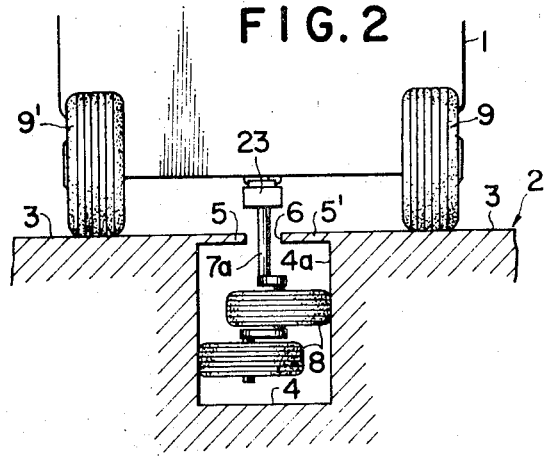
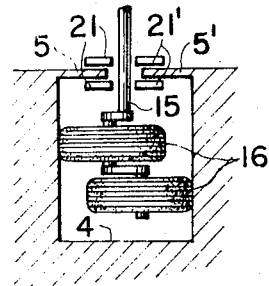
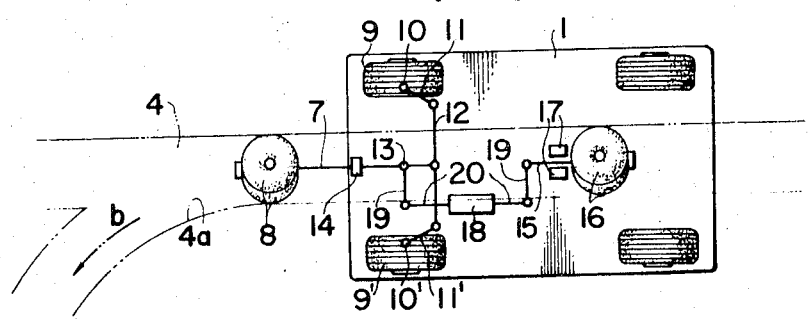

GUIDING SYSTEM FOR STEERING A VEHICLE

BACKGROUND OF THE INVENTION

This invention relates to a guiding system for a computer controlled vehicle along a selected path within a traffic network.

Many methods have been proposed for utilization of the computer as a means for controlling vehicular mass transportation in a traffic network. Several such schemes were disclosed in the International Fair held in Japan in 1970.

These traffic networks would provide for a plurality of vehicles all controlled by means of a computer so that each vehicle would follow a selected path so as to reach a desired point in a minimum period of time. In these methods, the vehicle must select the correct path within the traffic network without any malfunction. Such networks require provision of a simplified computer control logic and selecting mechanism to enable quick switching of a vehicle from one track or guide-way to another.

In railways, monorails, and the like, the tracks themselves are moved by a switch to transfer the vehicle from one track to another. In a mass transit system, the mass of moving track portions would be considerable. Therefore, there exists a need for a substitute for conventional rail switches.

SUMMARY OF THE INVENTION

The features of the present invention include a flat track surface and a guide channel, under the surface thereof, having a rectangular cross section and transversing the length of the track. Another feature of the invention is the provision of a steering guide link on the front of the vehicle, the steering linkage having two lower crank portions offset or staggered with respect to the axis of the link proper, and carrying two guide wheels mounted on the respective crank portions. The crank portions carrying the guide wheels are on the lower end of the steering guide link which extends through a slit in the track surface and into the guide channel. The two guide wheels contact the two vertical inner walls of the guide channel, thereby causing the wheels to follow the guide channel. The slit is defined by ribs extending from the upper edges of the channel inwardly.

A safety apparatus of a design similar to that of the steering guide linkage is mounted toward the rear of the vehicle. The safety means includes a linkage carried by the vehicle. The linkage of the safety means, like the linkage of the steering mechanism, is composed of horizontal and vertical leg portions. The vertical leg has at least two lower crank portions, on its lower end, beneath the guide-way surface, both of the crank portions vertically offset with respect to the axis of the vertical leg proper. Each of the crank portions has a horizontally mounted wheel which wheels are normally in contact with the adjacent interior walls of the guide channel. The horizontal leg is rotationally mounted under the vehicle for movement within fixed limits in the horizontal plane.

An emergency braking means is also provided in the form of two brake shoe pairs mounted on the vertical leg of the safety means. Each brake show pair has one shoe disposed above and the other beneath a rib of the track surface. The shoe pairs close together to "pinch" the ribs for emergency braking.

BRIEF DESCRIPTION OF THE DRAWINGS

FIG. 1 is a cross-sectional view of the system of the present invention;

FIG. 2 is a cross-sectional view taken along the line II—II of FIG. 1;

FIG. 3 is a bottom view of the vehicle shown in FIG. 1 and FIG. 2;

FIG. 4 is a cross-sectional view taken along the line IV—IV of FIG. 1.

DESCRIPTION OF THE PREFERRED EMBODIMENTS

With reference to FIG. 1, a vehicle 1 is shown as travelling in the direction of arrow (a) along the center line of flat surface 3 of guide-way 2. Guide-way 2 includes a guide channel 4 adapted to guide the vehicle as shown in FIG. 2. The guide channel has a narrow slit 6 defined by ribs 5 and 5' of surface 3, each extending horizontally from the upper opposite edges of the channel inward. The slit is co-extensive with the length of the channel 4. The vehicle 1 carries a steering guide link 7 connected to a front wheel steering mechanism, the link 7 extending through the slit 6 into the guide channel 4. The link 7 has lower crank portions with their axes being offset with respect to the axis of the link proper. The offset crank portions carry two guide wheels 8 each located in a horizontal plane, but in a staggered or offset vertical relationship. The guide wheels 8 remain in contact with inner vertical walls 4a of the guide channel 4, with the contacting or urging pressures between the wheels and the inner walls balanced so as to produce zero torque on the vehicle when not in motion.

The front wheel steering mechanism of the vehicle is shown in FIG. 3 as having on its front wheels 9 and 9' king pins 10 and 10' of a type similar to those used in automobiles.

The king pins 10 and 10' connect with arms 11 and 11' which in turn are linked to a tie-rod 12 pivotally connected to the steering guide link 7 by means of a pin 13 located midway thereon. The way-angle of the steering guide link 7 is designed to be equal to the steering angle of the front wheels. The weight of the steering guide link 7 is borne by the pin 13 and a receiving band 14.

The steering guide link 7 is formed with a vertical portion 7a which has flat sides adjacent to the slit 6 and which extends downwardly through the slit 6. The flat sides are designed to permit the use of a slit having a minimized width to minimize the shock which is encountered in transferring from one slit to another at intersections of the guide channels. The two guide wheels 8 are designed to minimize the width of the guide channel 4, by their arrangement in a staggered or offset vertical relationship rather than in a common horizontal plane. This feature also serves to minimize the width of the ribs 5 and 5', thus enabling a lightweight simple construction for the steering guide link 7 and sufficiently rigid ribs 5 and 5'.

As long as the vehicle 1 travels in a straight line, under normal conditions there exists no danger of the vehicle wheels running off the flat surface 3 of the guide-way 2. However, if the flat track 3 is frozen or if emergency braking is applied, there would result the possibility of the vehicle wheels running off the flat track. To prevent such an eventuality, there is provided a safety mechanism in the form of a wheel run-off preventive link 15 carried by the vehicle 1 and extending from the vehicle downwardly through the slit 6 into the guide channel 4. The link 15 has lower crank portions staggered or offset vertically which have mounted thereon two guide wheels 16 arranged in a manner similar to the arrangement of guide wheels 8. To prevent excessive lateral movement of the wheel run-off preventive link 15, there is provided a pair of stops 17, one on either side of the link 15. Thus, the run-off preventive link 15 is allowed to move laterally within the space between the two stops 17, the gap being sufficient to allow for a curved guide-way having a minimum turning radius.

A servo-mechanism 18 operates to select the correct path at guide-way intersections. The servo-mechanism 18 is connected by actuating rods 20 to arms 19 of steering guide link 7 and wheel run-off preventive link 15. The servo-mechanism operates to urge the guide wheels 8 and guide wheels 16 against the inner vertical walls 4a in accordance with the direction to be taken at the guide-way intersections. In the particular embodiment shown, the servo-mechanism 18 consists of a piston-cylinder assembly which is driven from an appropriate power source (electric, hydraulic or pneumatic). When the selecting servo-mechanism is not in operation, there should be provided means to free the steering link 7 and wheel run-off preventive link 15.

The operation of the servo-mechanism 18 will now be described with reference to FIG. 3. If the vehicle 1 is to follow the path indicated by arrow (b) at an intersection of the guide-ways, the servo-mechanism 18 will actuate so as to urge the guide wheels 8 and guide wheels 16 against the inner wall 4a which is on the diverging side of the vehicle. This insures a simple, fast and positive switching operation for the vehicle which runs at a high speed and at extremely close time intervals within the guide-way network. The servo-mechanism 18 operates in a similar manner where the guide-way on which the vehicle is travelling merges with another.

FIG. 4 shows an emergency brake system provided on the vehicle 1, that is in addition to the conventional brake system. The emergency brake system of the present invention includes two pairs of brake shoes 21 and 21', which are mounted on the wheel run-off preventive link 15 and each pair having shoes located on the upper and lower sides of the ribs 5 and 5'. The brake shoes 21 and 21' are adapted to be urged against their respective ribs to thereby produce a braking force (on the order of about 2 kg/cm$^2$), being actuated by means of high pressure gas or explosives.

As shown in FIG. 1, coupling means 22 and 23 are respectively mounted on the rear end of the wheel run-off preventive link 15 and on the front end of the steering guide link 7. The coupling means 22 and 23 enable a plurality of vehicles to be linked together. Vehicles equipped according to the present invention can be satisfactorily guided, even when a large number are coupled together.

Electric power may be fed to the vehicles by means of a combination of electric cables running along and within the guide channels and current collector means (not shown) mounted on the steering guide link or wheel run-off preventive link.

The invention may be embodied in other specific forms without departing from its spirit or essential characteristics. The above described embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A guiding system for guiding a computer controlled vehicle through a network of tracks, said system comprising in combination a guide channel formed coplanar with said track, a first pair of overlapping guide wheels disposed in said channel, each of said wheels extending in a generally horizontal direction with their respective axes being spaced so that one of said wheels normally engages one vertical wall of said channel and the other wheel normally engages the other vertical wall of said channel, first linkage means connecting said guide wheels relative to the front wheels of said vehicle, a second pair of guide wheels disposed in said channel and extending in a spaced relation to said first pair of guide wheels and to the rear of said front wheels of said vehicle, control means mounted on said vehicle and connected to said first guide wheel means by way of said first linkage means, and second linkage means connecting said second pair of guide wheels to said control means, said control means being adapted to positively press said first and second guide wheel means against a vertical guide wall surface on either side of said guide channel for guiding with stability the vehicle along a selected track at junctions of main and branch tracks.

2. The system of claim 1 wherein said control means is in the form of a servo-mechanism adapted to actuate said first and second linkage means in a manner to selectively urge said first and second pairs of guide wheels against the inner walls of said guide channel in response to said signal to cause the vehicle to follow a predetermined path at a track intersection.

3. The system of claim 1 wherein said second pair of guide wheels extend in an overlapping relationship with each wheel extending in a generally horizontal direction and with their respective axes being spaced so that one of said wheels normally engages one vertical wall of said channel and the other wheel normally engages the other vertical wall of said channel.

4. The system of claim 1 wherein said guide channel extends along the center line of, and immediately underneath, said track, said track having a surface covering said guide channel which is divided into two horizontal rib portions by a longitudinal slit co-extensive with its length, said slit providing access to the interior of said guide channel.

5. The system of claim 4 further comprising at least two brake shoe pairs mounted on said second linkage means, each of said brake shoe pairs having at least one shoe disposed above and at least one shoe disposed below one of said horizontal rib portions, said shoes being adapted to close together to pinch said rib portions for emergency braking.

6. The system of claim 1 further comprising means connecting each pair of guide wheels to their respective linkage means, said connecting means comprising a vertical leg portion associated with each pair of guide wheels, at least two lower crank portions connected to each vertical leg portion, both crank portions being vertically offset with respect to the axis of its respective vertical leg portion and being connected to a respective guide wheel.

7. The system of claim 6 wherein said first and second linkage means each includes a horizontally extending link member respectively connected to said vertical leg portions.

* * * * *

UNITED STATES PATENT OFFICE
CERTIFICATE OF CORRECTION

Patent No. 3,822,648　　　　　　　　　Dated July 9, 1974

Inventor(s) TAKEMOCHI ISHII, MASAKI KOSHI, and MASAKAZU IGUCHI

It is certified that error appears in the above-identified patent and that said Letters Patent are hereby corrected as shown below:

Page 1, "Inventors: Takemochi Ishii; Masaki Koshi, both of Tokyo, Japan"
should read --Inventors: Takemochi Ishii; Masaki Koshi; and Masakazu Iguchi, all of Tokyo, Japan--.

Signed and sealed this 10th day of December 1974.

(SEAL)
Attest:

McCOY M. GIBSON JR.　　　　　　　　C. MARSHALL DANN
Attesting Officer　　　　　　　　　Commissioner of Patents